United States Patent Office 3,423,428
Patented Jan. 21, 1969

3,423,428
3,4-METHYLENEDIOXYPHENYL-3-HALO-2-PROPYNYL ETHERS
Josef Fellig, Glen Rock, and Albert Israel Rachlin, Verona, N.J., assignors to Hoffmann-La Roche Inc., Nutley, N.J., a corporation of New Jersey
No Drawing. Filed Mar. 3, 1966, Ser. No. 531,371
U.S. Cl. 260—340.5                      3 Claims
Int. Cl. C07d 13/10; A01n 9/02, 9/24

This invention relates to novel propynyl ether derivatives and to novel compositions containing said propynyl ether derivatives. More particularly, the invention relates to compounds of the formula

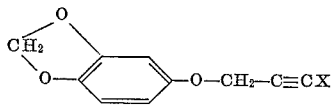

I wherein X represents hydrogen, iodine, bromine or chlorine and to synergistic insecticidal compositions comprising a compound of Formula I together with an insecticidal carbamate.

The novel 3,4-methylenedioxyphenyl-2-propynyl ether compounds of this invention can be obtained via a number of alternative preparative routes. They can, for example, be prepared by condensing 3,4-methylenedioxyphenol with 1-halo-2-propynyl ether to form 3,4-methylenedioxylphenyl-2-propynyl ether which is, in turn, halogenated by any of the usual methods for halogenating acetylenic carbons to form the corresponding 3-iodo, 3-bromo and 3-chloro derivatives. Alternatively, the halogenated end products can be obtained directly by condensing, 3,4-methylenedioxyphenol with the appropriate 1,3-dihalo-2-propyne.

The novel end products of this invention as indicated above are useful as an active ingredient in the novel insecticidal compositions of this invention. Said novel compositions consist essentially of a carbamate insecticide and a methylenedioxy propynyl ether of Formula I above. As the carbamate portion of the composition of this invention, there can be utilized any of the known insecticidal carbamates. The term "insecticidal carbamate" is a term well recognized by those skilled in the insecticidal art and encompasses a variety of carbocyclic and heterocyclic carbamates of which the following exemplary compounds are particularly well suited to the novel compositions of this invention; 1-naphthyl-N-methylcarbamate, 4-(N,N-dimethylamino)-3,5-xylyl-N-methylcarbamate, 1-isopropyl-3-methylpyrazoloyl-5-dimethylcarbamate.

In still another aspect, the present invention comprises a method of killing insects by contacting them with the novel synergistic insecticidal compositions of this invention. According to the present invention, it has been found that the carbamate insecticides and particularly those carbamate insecticides listed above in combination with a 3,4-methylene-dioxyphenyl-2-propynyl ether of Formula I and especially the compound 3,4-methylenedioxyphenyl-2-propynyl ether provide an insecticide of greatly enhanced activity. Said combination providing both a qualitative and a quantitative improvement over the additive effort of the two ingredients.

The exact proportions of the two components of the novel synergistic compositions of this invention as an insecticidal formulation will vary with the type of use for which the insecticide is to be employed, the methods of application, the nature of the insects to be controlled and other factors encountered in the insecticidal art. The ratio of ingredients, i.e., carbamate to propynyl ether can vary between wide limits. Practical considerations however limit the amount of the propynyl ether used to about 0.5 to about 5 parts by weight per part of carbamate present in the composition. The total concentration of the combined ingredients in a final insecticidal composition will vary with the form of application and type of use. The compositions of this invention can be formulated, for example, as concentrates or as granules or with carriers as sprays, aerosols or dusts. For some purposes, it is preferred that the carriers include emulsions, solutions or organic solvents as well as ancillary suspending and wetting agents. Solid carriers may also be employed including chalk, talc, bentonite, kaolin, diatomaceous earth, silica, fuller's earth, lime, gypsum, flour and similar powders. The compositions may also contain other additives such as emulsifying agents, wetting agents and masking agents, etc., or they can be combined with other known insecticides such as pyrethrins, etc. In general, the techniques used in formulating insecticidal compositions of 1-naphthyl-N-methylcarbamate as described in Farm Chemicals, volume 128, page 52 et seq. can also be employed in formulating insecticidal combinations of the present invention.

The compositions of this invention may be concentrates suitable for storage or transport containing, for example, from about 40 to about 80% by weight of the novel synergistic combination. Such concentrates can be diluted with the same or a different carrier to a concentration suitable for application. In particular, concentrations of about 2 to about 20% by weight of the active material based on the total weight of the composition are satisfactory for application, though higher or lower concentrations can be applied depending upon the mode of the application. The synergistic combinations of this invention are operative in destroying insects by any of the usual techniques such as contact, ingestion and the like. They can be applied as a single composition or, alternatively, the individual components can be applied serially in any order at time intervals of up to about 8 hours or longer.

In the form in which applied the concentrations of active ingredients and the vehicles are adjusted so that flying insects are exposed to lethal amounts of space sprays or aerosols and crawling, chewing and hopping insects are exposed to surfaces that have been coated with lethal amounts of the composition in dusts or in spray form. The novel compositions are active against a wide variety of insects. They are active, for example, against Diptera such as house flies, fruit flies, mosquitoes, stable flies, face flies, etc.; Lepidoptera such as cabbage loopers, spruce budworms, gypsy moths, corn earworms, army worms, etc., and Coleoptera such as alfalfa weevils, flower beetles, etc.

The following tables exemplify the results obtained in experiments using direct topical application of typical synergistic compositions of this invention. The test consists in the topical application to houseflies of specified amounts of a synergistic composition according to the invention in a standard volume of acetone (1 mcl.). Only adult female flies 4 to 10 days old are used for testing. Three replicates of ten flies each are used for each compound and each concentration, the testing is done as follows: a cage of flies holding approximately 500 individual flies is briefly exposed to an atmosphere of carbon dioxide in a specially constructed chamber to anesthetize the insects. They are then transferred to several porcelain table-type Buchner funnels through which a slow stream of carbon dioxide is maintained and they are then sorted out by sex, the males being discarded. Ten female flies are placed on a filter paper, positioned in the top of a disposable plastic petri dish (diameter 100 mm., height 20 mm.). A cotton wick soaked with reconstituted nonfat powdered milk is placed into the dish to serve as a source of moisture and food. Exactly 1.0 mcl. of acetone solution of the test compound as measured by an ISCO micro-applicator is applied to the thoracic region of each fly (the micro-applicator which is available commercially from Instrumentation Specialties Company, Lincoln, Nebraska, is essentially a synchronous motor driven micro-syringe with a timed relay). After the application of the test solution, the bottom of the petri dish into which about 10 small holes had been pierced to allow for air circulation is placed in position. The assemled petri dishes holding the test insects are then placed in a holding room at 78 to 80° F. for a period of 24 hours. Knockdown is checked at short time intervals for up to 4 hours following application, mortality is checked at 24 hours at which time the test is terminated. Untreated and acetone-treated controls are included with all series.

TABLE I.—INSECTICIDAL ACTIVITY OF INSECTICIDAL CARBAMATE-3,4-METHYLENEDIOXYPHENYL 2-PROPYNYL ETHER COMPOSITIONS

| 3,4-methylene dioxyphenyl 2-propynyl ether (mcg./fly) | 1-naphthyl-N-methyl carbamate (mcg./fly) | Percent Kill |
|---|---|---|
| 10.0 | | 0 |
| | 10.0 | 0 |
| 1.0 | 0.2 | 83 |
| 2.0 | 0.4 | 100 |
| | 1-isopropyl-3-methylpyrazolyl-5-dimethylcarbamate | |
| | 0.5 | 0 |
| | 1.0 | 0 |
| | 2.0 | 20 |
| | 3.0 | 50 |
| | 6.0 | 100 |
| 0.5 | 0.1 | 50 |
| 1.0 | 0.2 | 90 |
| 2.0 | 0.4 | 100 |
| | 0.4 | 0 |
| | 0.8 | 15 |
| | 1.0 | 43 |
| | 2.0 | 100 |
| 0.5 | 0.1 | 0 |
| 1.0 | 0.2 | 70 |
| 2.5 | 0.5 | 100 |

TABLE II.—INSECTICIDAL ACTIVITY OF INSECTICIDAL CARBAMATE-3,4-METHYLENEDIOXYPHENYL 3-IODO-2-PROPYNYL ETHER COMPOSITIONS

| 3,4-methylene-dioxyphenyl 3-iodo-2-propynyl ether (mcg./fly) | 1-naphthyl-N-methyl-carbamate (mcg./fly) | Percent Kill |
|---|---|---|
| 1.0 | 0.2 | 83 |
| 2.0 | 0.4 | 100 |

The examples which follow illustrate the preparation of the novel compounds of this invention. All temperatures stated are in degrees centigrade.

Example 1.—Preparation of 3,4-methylenedioxyphenyl 2-propynyl ether

To a 500 ml. 3-neck round bottom flask equipped with a stirrer and a reflux condenser were charged 50 g. (0.36 mole) of 3,4-methylenedioxyphenol (sesamol), 46.4 g. (0.39 mole) of 3-bromopropyne, 55 g. (0.39 mole) of potassium carbonate, and 350 ml. of acetone. After the reaction mixture was stirred and refluxed for 8 hours, the solids were filtered and the filtrate was evaporated at 60° under reduced pressure. The residue was distilled under a pressure of 0.05 mm. at 88° to yield 3,4-methylenedioxyphenyl 2-propynyl ether.

Example 2.—Preparation of 3,4-methylenedioxyphenyl 3-iodo-2-propynyl ether

To a 250 ml. 3-neck round bottom flask equipped with a stirrer, a dropping funnel, and a thermometer were charged 8.0 g. (0.04 mole) of 3,4-methylenedioxy 2-propynyl ether and 50 ml. of methanol. To the vigorously stirred solution were added simultaneously 11.2 g. (0.044 mole) of iodine, in small portions and 35 ml. of a 10% aqueous solution of sodium hydroxide (0.088 mole) dropwise over a period of 15 minutes while the reaction temperature was kept between 20 and 25° by means of an icewater bath. After stirring for 1 hour longer at room temperature, the reaction mixture was diluted with 100 ml. of water and chilled with an ice-water bath. The crystals which formed were filtered and dried in a vacuum oven at 60° to yield 3,4-methylenedioxyphenyl 3-iodo-2-propynyl ether, M.P. 71–73°.

We claim:
1. A compound of the formula

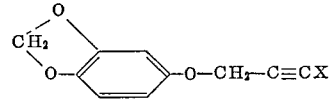

wherein X represents hydrogen, iodine, bromine or chlorine.

2. The compound of claim 1 wherein X is hydrogen, having the name, 3,4-methylenedioxyphenyl 2-propynyl ether.

3. The compound of claim 1 wherein X is iodine, having the name 3,4-methylenedioxyphenyl 3-iodo-2-propynyl ether.

References Cited

UNITED STATES PATENTS 3,322,813   5/1967   Seki et al. _____ 260—465

NICHOLAS S. RIZZO, *Primary Examiner.*

J. H. TURNIPSEED, *Assistant Examiner.*

U.S. Cl. X.R.
424—282, 273, 300

UNITED STATES PATENT OFFICE
CERTIFICATE OF CORRECTION

Patent No. 3,423,428                                                January 21, 1969

Josef Fellig et al.

It is certified that error appears in the above identified patent and that said Letters Patent are hereby corrected as shown below:

Column 1, lines 26 and 27, "3,4-methylenedioxylphenyl-" should read -- 3,4-methylenedioxyphenyl- --; line 48, "3-methyl-pyrazoloyl-" should read -- 3-methylpyrazolyl- --; line 61, "effort" should read -- effect --. Column 3, between lines 30 and 31, in the TABLE I, insert the sub-title -- 4-(N,N-dimethylamino)-3,5-xylyl N-methyl-carbamate (mcg./fly) --.

Signed and sealed this 24th day of March 1970.

(SEAL)
Attest:

Edward M. Fletcher, Jr.                                  WILLIAM E. SCHUYLER, JR.
Attesting Officer                                                 Commissioner of Patents